US012628854B2

(12) United States Patent
Sukuru et al.

(10) Patent No.: US 12,628,854 B2
(45) Date of Patent: May 19, 2026

(54) DELAYED RELEASE SOFTGEL CAPSULES IN HIGHER pH ENVIRONMENT

(71) Applicant: R.P. Scherer Technologies, LLC, Carson City, NV (US)

(72) Inventors: Karunakar Sukuru, St. Petersburg, FL (US); Qi Fang, St. Petersburg, FL (US); Haitao Li, St. Petersburg, FL (US)

(73) Assignee: R.P. Scherer Technologies, LLC, Carson City, NV (US)

( * ) Notice: Subject to any disclaimer, the term of this patent is extended or adjusted under 35 U.S.C. 154(b) by 673 days.

(21) Appl. No.: 17/772,698

(22) PCT Filed: Oct. 27, 2020

(86) PCT No.: PCT/US2020/057522
§ 371 (c)(1),
(2) Date: Apr. 28, 2022

(87) PCT Pub. No.: WO2021/086848
PCT Pub. Date: May 6, 2021

(65) Prior Publication Data
US 2022/0400724 A1 Dec. 22, 2022

Related U.S. Application Data

(60) Provisional application No. 62/926,681, filed on Oct. 28, 2019.

(51) Int. Cl.
| | |
|---|---|
| *A23L 29/231* | (2016.01) |
| *A23L 29/269* | (2016.01) |
| *A23L 29/281* | (2016.01) |
| *A23L 33/29* | (2016.01) |
| *A23P 10/30* | (2016.01) |

(52) U.S. Cl.
CPC ........... *A23L 29/231* (2016.08); *A23L 29/272* (2016.08); *A23L 29/273* (2016.08); *A23L 29/284* (2016.08); *A23L 33/29* (2016.08); *A23P 10/30* (2016.08)

(58) Field of Classification Search
CPC .... A23L 29/231; A23L 29/273; A23L 29/272; A23L 29/284; A23L 33/29; A23P 10/30
See application file for complete search history.

(56) References Cited

U.S. PATENT DOCUMENTS

| | | | |
|---|---|---|---|
| 7,041,315 | B2 | 5/2006 | Scott et al. |
| 10,226,432 | B2 | 3/2019 | Teles et al. |
| 2002/0114832 | A1* | 8/2002 | Herrmann ............ A61K 36/534 |
| | | | 424/747 |
| 2003/0175335 | A1 | 9/2003 | Scott |
| 2008/0299199 | A1 | 12/2008 | Bar-Shalom et al. |
| 2010/0158840 | A1* | 6/2010 | Hiramoto ................ A61L 9/013 |
| | | | 424/65 |
| 2010/0158958 | A1 | 6/2010 | Chidambaram |
| 2013/0280323 | A1* | 10/2013 | Fang .................... A61K 31/485 |
| | | | 514/315 |
| 2015/0004226 | A1 | 1/2015 | Baes et al. |
| 2015/0118298 | A1 | 4/2015 | Zhang et al. |
| 2017/0119680 | A1 | 5/2017 | McGuffy et al. |
| 2017/0119711 | A1 | 5/2017 | Hu et al. |
| 2017/0209384 | A1 | 7/2017 | Watanabe et al. |
| 2017/0296474 | A1 | 10/2017 | Masuda |
| 2018/0169051 | A1* | 6/2018 | Zhang .................. A61K 31/202 |
| 2018/0235891 | A1 | 8/2018 | Fang et al. |
| 2018/0353432 | A1 | 12/2018 | Carucci et al. |

FOREIGN PATENT DOCUMENTS

| | | | |
|---|---|---|---|
| CN | 101919827 | A | 12/2010 |
| CN | 103483604 | A | 1/2014 |
| CO | 2021018071 | A2 | 4/2022 |
| EA | 7563 | B1 | 12/2006 |
| EP | 3178473 | A1 | 6/2017 |
| JP | H0427352 | A | 1/1992 |
| JP | 2009028544 | A1 * | 2/2009 |
| WO | 0217886 | A1 | 3/2002 |
| WO | 2004030658 | A1 | 4/2004 |
| WO | 2006016577 | A1 | 2/2006 |
| WO | 2007075475 | A2 | 7/2007 |
| WO | 2013093630 | A2 | 6/2013 |
| WO | 2017097612 | A1 | 6/2017 |
| WO | 2019178444 | A1 | 9/2019 |

OTHER PUBLICATIONS

Davie Mabey, "Epidemiology of Sexually Transmitted Infections: Worldwide", Epidemilogy and Sexual Behaviour, 42:6, 2014 Elsevier Ltd., 4 pages.
Tran et al., Survival Comparision between Glioblastoma Multiforme and Other Incurable Cancers, Journal of Clinical Neuroscience 18 (2010) , 5 pages.
Miguel Lopez-Lazaro, "The Migration Ability of Stem Cells can Explain the Existence of Cancer of Unknown Primary Site. Rethinking Metastasis", Oncoscience, 2015, vol. 2, No. 5, 1 page.
Peter B. Dirks, "Brain Tumor Stem Cells: Bringing Order to the Chaos of Brian Cancer", Journal of Clinical Oncology, vol. 26, No. 17, Jun. 10, 2008, 1 page.
Choudhary, "Different Types of Dissolution Apparatus", Pharmaceutical Guildlines, 2017, 2 pages.
International Search Report and Written Opinon for PCT/US2020/057522 mailed Jan. 26, 2021, 9 pages.
Extended European Search Report for European Application No. 20880928.5, mailed Nov. 6, 2023, 7 Pages.
Badipatla, Viswesvararao "Disintegration of Tablets and Capsules Measured by Isothermal Thermal Mechanical Analysis and Macrophotography," Bachelor of Science in Pharmacy, May 2007, ETD Archive, 2010, pp. 4, 13, retrieved from the Internet on Jan. 15, 2024 at: https://engagedscholarship.csuohio.edu/etdarchive/743), 95 pages.
Espitia P.J.P., et al., "Edible Films From Pectin: Physical-mechanical And Antimicrobial Properties—A Review," Food Hydrocolloids, Mar. 2014, vol. 35, pp. 287-296.

(Continued)

*Primary Examiner* — Blessing M Fubara
(74) *Attorney, Agent, or Firm* — Lowenstein Sandler LLP

(57) ABSTRACT

Disclosed in certain embodiments is a delayed release softgel capsules comprise a fill material that is encapsulated in a pH dependent shell composition, the pH dependent shell composition including pectin and gellan gum. Also disclosed are methods of preparing any of the delayed release softgel capsules described herein and methods of use thereof.

13 Claims, No Drawings

(56)                 References Cited

OTHER PUBLICATIONS

Examination Report for Colombian Patent Application No. 20220007168, mailed Feb. 24, 2025, 6 Pages.
Office Action for Colombian Patent Application No. CO2022007168, mailed Oct. 31, 2025, 20 Pages.

* cited by examiner

DELAYED RELEASE SOFTGEL CAPSULES IN HIGHER pH ENVIRONMENT

RELATED APPLICATIONS

The present application is a national stage entry under 35 U.S.C. § 371 of International Application No. PCT/US2020/057522, filed on Oct. 27, 2020, which claims priority to U.S. Provisional Patent Application No. 62/926,681, filed Oct. 28, 2019, which are herein incorporated by reference in their entirety.

FIELD OF THE INVENTION

The present invention relates to delayed release softgel capsules, wherein the gelatin-based shell compositions comprise pectin and gellan gum.

BACKGROUND OF THE INVENTION

Soft capsules, in particular, soft gelatin capsules (or softgel capsules), provide a dosage form which is more readily accepted by patients, since the capsules are easy to swallow and need not be flavored in order to mask any unpleasant taste of the active agent. Softgel encapsulation of drugs further provides the potential to improve the bioavailability of the pharmaceutical agents. For example, active ingredients may be rapidly released in liquid form as soon as the gelatin shell ruptures.

Efforts have been made to create delayed release dosage forms. Delayed release dosage forms are designed to protect the contents of the dosage form from gastric conditions. For example, delayed release dosage forms may be produced by adding a pH dependent coating to the surface of a manufactured dosage form such as a tablet or a capsule. Such coatings may be applied through spraying the dosage form, followed by drying the dosage form, usually at elevated temperatures. This method of coating a capsule with a pH dependent coating may lead to disadvantages in terms of performance and appearance. For example, the capsule may appear rough, the coating may be applied unevenly, and/or the coating can be prone to cracking or flaking off the dosage form. Additionally, the process of applying a pH dependent coating is very inefficient.

Other delayed release dosage forms have been developed in which conventional pH dependent polymers (i.e., acid-insoluble polymers) are added in the capsule shell. However, the addition of conventional pH dependent polymers can lead to capsules that are prone to leaking due to insufficient sealing.

Typical delayed release formulations may release active agents at a pH which is only slightly above the normal pH of the stomach. This is problematic due to patient variabilities in stomach pH and may provide issues with respect to active agent stability and unintentional release of the active agent at a point higher in the gastro-intestinal tract than intended.

Accordingly, there is currently a need for a delayed release softgel capsule that does not release or does not substantially release the active agent at certain pH levels above the pH of the stomach.

SUMMARY OF THE INVENTION

The present invention is directed to delayed release softgel capsules. The delayed release softgel capsules comprise (a) a fill material and (2) a pH dependent shell composition.

In an embodiment, the pH dependent shell composition comprises: (a) a gelatin, (b) gellan gum and (c) a pectin such as a low methoxyl pectin and optionally (d) a plasticizer and (e) dextrose. The present invention is also directed to a process of making delayed release softgel capsules.

In certain embodiments, the delayed release softgel capsules according to the present invention do not require either a pH dependent coating or an added conventional pH dependent polymer. Accordingly, the pH dependent shell composition eliminates the need to add a pH dependent coating, which also minimizes the risk of damaging the capsules during the coating process.

In certain embodiments, the instant disclosure is also directed to a method of treating a condition by administering to a subject in need thereof any of the delayed release softgel compositions described herein.

DETAILED DESCRIPTION OF THE INVENTION

The present invention advances the state of the art by developing delayed release oral dosage forms, in particular, delayed release softgel capsules, that do not release the active agent or substantially release the active agent at a pH level above that of a typical gastric environment of 1.2 but rather release the active agent at a targeted location within the gastrointestinal tract having a targeted pH (such as a pH of 2 or higher, 3 or higher, 4 or higher, 5 or higher, 6 or higher, 7 or higher, or 8 or higher). The dissolution profile of the delayed release capsules described herein can be tuned by modifying the shell composition of the softgel capsules.

Such mechanism is beneficial for delivery of active agents that may cause stomach irritation or are sensitive to the acidic environment of the stomach. Such mechanism is also beneficial for reducing belching after consuming capsules that encapsulate fill materials that tend to contribute to belching. For instance, belching often occurs upon consuming vitamin, minerals, supplements, and/or pharmaceutical products that are formulated in dosage form exhibiting some leaking (even of a very small amount), in the stomach, before reaching the intestines. The leakage can be particularly problematic when the belching is associated with substances that have a noisome perception such as fish oil and garlic that are commonly delivered in softgels. The delayed release softgel capsules described herein may be formulated in a manner that minimizes and/or eliminates premature leakage (and consequently premature release of the capsule's fill) in the gastric environment of the stomach. Further, the delayed release softgel capsules described herein may achieve these benefits among different subjects, including those subjects whose pH values along different portions of the gastrointestinal tract deviates from the "standard" or "average" pH, due to, e.g., diet variations.

In certain embodiments, the delayed release softgel capsule comprises (a) a fill material and (b) a shell composition, wherein the fill material comprises at least one active agent, and wherein the shell composition comprises gelatin and a pH dependent polymer comprising pectin and gellan gum.

In certain embodiments, the shell composition does not rupture at a pH of 5 at 15 minutes, 30 minutes, 45 minutes, 60 minutes, 90 minutes or 120 minutes (e.g., when measured with a USP Apparatus II with paddles at 50 RPM, 750-900 ml 0.1N HCL acidic media adjusted to pH with phosphate buffer, sodium hydroxide, or potassium hydroxide).

In certain embodiments, the shell composition does not rupture at a pH of 5 for a time period of at least about 15 minutes, at least about 30 minutes, at least about 45 minutes, at least about 60 minutes, at least about 90 minutes, or at least about 120 minutes (e.g., when measured with a USP Apparatus II with paddles at about 50 RPM to about 250 RPM, about 500 ml to about −900 ml of 0.1N HCL acidic media adjusted to pH with phosphate buffer, sodium hydroxide, or potassium hydroxide).

In certain embodiments, the shell composition does not rupture at a pH of 5 for a time period of about 15 minutes to about 360 minutes, about 30 minutes to about 240 minutes, or about 45 minutes to about 180 minutes (e.g., when measured with a USP Apparatus II with paddles at about 50 RPM to about 250 RPM, about 500 ml to about 900 ml of 0.1N HCL acidic media adjusted to pH with phosphate buffer, sodium hydroxide, or potassium hydroxide).

In certain embodiments, the shell composition does not rupture at a pH of between 5 and 6 at 15 minutes, 30 minutes, 45 minutes, 60 minutes, 90 minutes or 120 minutes (e.g., when measured with a USP Apparatus II with paddles at 50 RPM, 750-900 ml 0.1N HCL acidic media adjusted to pH with phosphate buffer, sodium hydroxide, or potassium hydroxide).

In certain embodiments, the shell composition does not rupture at a pH of between 5 and 6 for a time period of at least about 15 minutes, at least about 30 minutes, at least about 45 minutes, at least about 60 minutes, at least about 90 minutes, or at least about 120 minutes (e.g., when measured with a USP Apparatus II with paddles at about 50 to about 250 RPM, about 500 ml to about 900 ml of 0.1N HCL acidic media adjusted to pH with phosphate buffer, sodium hydroxide, or potassium hydroxide).

In certain embodiments, the shell composition does not rupture at a pH of between 5 and 6 for a time period of about 15 minutes to about 360 minutes, about 30 minutes to about 240 minutes, or about 45 minutes to about 180 minutes (e.g., when measured with a USP Apparatus II with paddles at about 50 RPM to about 250 RPM, about 500 ml to about 900 ml of 0.1N HCL acidic media adjusted to pH with phosphate buffer, sodium hydroxide, or potassium hydroxide).

In certain embodiments, the shell composition does not rupture at a pH of between 6 and 7 at 15 minutes, 30 minutes, 45 minutes, 60 minutes, 90 minutes or 120 minutes (e.g., when measured with a USP Apparatus II with paddles at 50 RPM, 750-900 ml 0.1N HCL acidic media adjusted to pH with phosphate buffer, sodium hydroxide, or potassium hydroxide).

In certain embodiments, the shell composition does not rupture at a pH of between 6 and 7 for a time period of at least about 15 minutes, at least about 30 minutes, at least about 45 minutes, at least about 60 minutes, at least about 90 minutes, or at least about 120 minutes (e.g., when measured with a USP Apparatus II with paddles at about 50 RPM to about 250 RPM, about 500 ml to about 900 ml 0.1N HCL acidic media adjusted to pH with phosphate buffer, sodium hydroxide, or potassium hydroxide).

In certain embodiments, the shell composition does not rupture at a pH of between 6 and 7 for a time period of about 15 minutes to about 360 minutes, about 30 minutes to about 240 minutes, or about 45 minutes to about 180 minutes (e.g., when measured with a USP Apparatus II with paddles at about 50 RPM to about 250 RPM, about 500 ml to about 900 ml of 0.1N HCL acidic media adjusted to pH with phosphate buffer, sodium hydroxide, or potassium hydroxide).

In certain embodiments, the shell composition does not rupture at a pH of between 7 and 8 at 15 minutes, 30 minutes, 45 minutes, 60 minutes, 90 minutes or 120 minutes (e.g., when measured with a USP Apparatus II with paddles at 50 RPM, 750-900 ml 0.1N HCL acidic media adjusted to pH with phosphate buffer, sodium hydroxide, or potassium hydroxide).

In certain embodiments, the shell composition does not rupture at a pH of between 7 and 8 for a time period of at least about 15 minutes, at least about 30 minutes, at least about 45 minutes, at least about 60 minutes, at least about 90 minutes, or at least about 120 minutes (e.g., when measured with a USP Apparatus II with paddles at about 50 RPM to about 250 RPM, about 500 ml to about 900 ml 0.1N HCL acidic media adjusted to pH with phosphate buffer, sodium hydroxide, or potassium hydroxide).

In certain embodiments, the shell composition does not rupture at a pH of between 7 and 8 for a time period of about 15 minutes to about 360 minutes, about 30 minutes to about 240 minutes, or about 45 minutes to about 180 minutes (e.g., when measured with a USP Apparatus II with paddles at about 50 RPM to about 250 RPM, about 500 ml to about 900 ml of 0.1N HCL acidic media adjusted to pH with phosphate buffer, sodium hydroxide, or potassium hydroxide).

In certain embodiments, the shell composition does not rupture at a pH of between 8 and 8.4 at 15 minutes, 30 minutes, 45 minutes, 60 minutes, 90 minutes or 120 minutes (e.g., when measured with a USP Apparatus II with paddles at 50 RPM, 750-900 ml 0.1N HCL acidic media adjusted to pH with phosphate buffer, sodium hydroxide, or potassium hydroxide).

In certain embodiments, the shell composition does not rupture at a pH of between 8 and 8.4 for a time period of at least about 15 minutes, at least about 30 minutes, at least about 45 minutes, at least about 60 minutes, at least about 90 minutes, or at least about 120 minutes (e.g., when measured with a USP Apparatus II with paddles at about 50 RPM to about 250 RPM, about 500 ml to about 900 ml 0.1N HCL acidic media adjusted to pH with phosphate buffer, sodium hydroxide, or potassium hydroxide).

In certain embodiments, the shell composition does not rupture at a pH of between 8 and 8.4 for a time period of about 15 minutes to about 360 minutes, about 30 minutes to about 240 minutes, or about 45 minutes to about 180 minutes (e.g., when measured with a USP Apparatus II with paddles at about 50 RPM to about 250 RPM, about 500 ml to about 900 ml of 0.1N HCL acidic media adjusted to pH with phosphate buffer, sodium hydroxide, or potassium hydroxide).

In certain embodiments, the shell composition does not rupture at a pH of less than 8.4, less than 8.3, less than 8.2, less than 8.1, less than 8.0, less than 7.9, less than 7.8, less than 7.7, less than 7.6, less than 7.5, less than 7.4, less than 7.3, less than 7.2, less than 7.1, less than 7.0, less than 6.9, less than 6.8, less than 6.7, less than 6.6, less than 6.5, less than 6.4, less than 6.3, less than 6.2, less than 6.1, less than 6.0, less than 5.9, less than 5.8, less than 5.7, less than 5.6, less than 5.5, less than 5.4, less than 5.3, less than 5.2, less than 5.1, less than 5.0, less than 4.9, less than 4.8, less than 4.7, less than 4.6, less than 4.5, less than 4.4, less than 4.3, less than 4.2, less than 4.1, less than 4.0, less than 3.9, less than 3.8, less than 3.7, less than 3.6, less than 3.5, less than 3.4, less than 3.3, less than 3.2, less than 3.1, less than 3.0, less than 2.9, less than 2.8, less than 2.7, less than 2.6, less than 2.5, less than 2.4, less than 2.3, less than 2.2, less than 2.1, less than 2.0, less than 1.9, less than 1.8, less than 1.7, less than 1.6, less than 1.5, less than 1.4, less than 1.3 or less than 1.2 for a time period of 15 minutes, 30 minutes, 45 minutes, 60 minutes, 90 minutes or 120 minutes (e.g., when measured with a USP Apparatus II with paddles at 50 RPM, 750-900 ml 0.1N HCL acidic media adjusted to pH with phosphate buffer, sodium hydroxide, or potassium hydroxide).

In certain embodiments, the shell composition does not rupture at a pH of less than 8.4, less than 8.3, less than 8.2, less than 8.1, less than 8.0, less than 7.9, less than 7.8, less than 7.7, less than 7.6, less than 7.5, less than 7.4, less than 7.3, less than 7.2, less than 7.1, less than 7.0, less than 6.9, less than 6.8, less than 6.7, less than 6.6, less than 6.5, less than 6.4, less than 6.3, less than 6.2, less than 6.1, less than 6.0, less than 5.9, less than 5.8, less than 5.7, less than 5.6, less than 5.5, less than 5.4, less than 5.3, less than 5.2, less than 5.1, less than 5.0, less than 4.9, less than 4.8, less than 4.7, less than 4.6, less than 4.5, less than 4.4, less than 4.3, less than 4.2, less than 4.1, less than 4.0, less than 3.9, less than 3.8, less than 3.7, less than 3.6, less than 3.5, less than 3.4, less than 3.3, less than 3.2, less than 3.1, less than 3.0, less than 2.9, less than 2.8, less than 2.7, less than 2.6, less than 2.5, less than 2.4, less than 2.3, less than 2.2, less than 2.1, less than 2.0, less than 1.9, less than 1.8, less than 1.7, less than 1.6, less than 1.5, less than 1.4, less than 1.3, or less than 1.2 for a time period of at least about 15 minutes, at least about 30 minutes, at least about 45 minutes, at least about 60 minutes, at least about 90 minutes, or at least about 120 minutes (e.g., when measured with a USP Apparatus II with paddles at about 50 RPM to about 250 RPM, about 500 ml to about 900 ml 0.1N HCL acidic media adjusted to pH with phosphate buffer, sodium hydroxide, or potassium hydroxide).

In certain embodiments, the shell composition does not rupture at a pH of less than 8.4, less than 8.3, less than 8.2, less than 8.1, less than 8.0, less than 7.9, less than 7.8, less than 7.7, less than 7.6, less than 7.5, less than 7.4, less than 7.3, less than 7.2, less than 7.1, less than 7.0, less than 6.9, less than 6.8, less than 6.7, less than 6.6, less than 6.5, less than 6.4, less than 6.3, less than 6.2, less than 6.1, less than 6.0, less than 5.9, less than 5.8, less than 5.7, less than 5.6, less than 5.5, less than 5.4, less than 5.3, less than 5.2, less than 5.1, less than 5.0, less than 4.9, less than 4.8, less than 4.7, less than 4.6, less than 4.5, less than 4.4, less than 4.3, less than 4.2, less than 4.1, less than 4.0, less than 3.9, less than 3.8, less than 3.7, less than 3.6, less than 3.5, less than 3.4, less than 3.3, less than 3.2, less than 3.1, less than 3.0, less than 2.9, less than 2.8, less than 2.7, less than 2.6, less than 2.5, less than 2.4, less than 2.3, less than 2.2, less than 2.1, less than 2.0, less than 1.9, less than 1.8, less than 1.7, less than 1.6, less than 1.5, less than 1.4, less than 1.3, or less than 1.2 for a time period of about 15 minutes to about 360 minutes, about 30 minutes to about 240 minutes, or about 45 minutes to about 180 minutes (e.g., when measured with a USP Apparatus II with paddles at about 50 RPM to about 250 RPM, about 500 ml to about 900 ml of 0.1N HCL acidic media adjusted to pH with phosphate buffer, sodium hydroxide, or potassium hydroxide).

By virtue of the present invention, the pH that is suitable to rupture the shell composition and release the active agent can be selected in order to program the release of the active agent at the intended portion of the gastro-intestinal tract. For example, the duodenum has a typical pH ranging from 7.0 to 8.5; the small and large intestine typically have a pH of 4.0 to 7.0; the colon has a typical pH of 6.5 and the jejunum has a typical pH of 6.1 to 7.2. In one embodiment, the shell composition may be adjusted to target release of the active agent in the duodenum at a pH of about 7.0 to about 8.5. In one embodiment, the shell composition may be adjusted to target release of the active agent in the small and large intestine at a pH of about 4.0 to about 7.0. In one embodiment, the shell composition may be adjusted to target release of the active agent in the colon at a pH of about 6.5. In one embodiment, the shell composition may be adjusted to target release of the active agent in the jejunum at a pH of about 6.1 to about 7.2.

In certain embodiments, the weight ratio of pectin to gellan gum is about 1:10 to about 50:1; about 1:5 to about 40:1; about 1:1 to about 25:1; or about 10:1 to about 24:1.

As used herein, the term "pH dependent" is used to refer to the dissolution or disintegration resistant property of a substance such that dissolution or disintegration in certain embodiments does not occur or does not substantially occur in a gastric environment or in alternative embodiments does not occur or substantially occur in the pH ranges as disclosed herein, e.g., for a time period of at least about 15 minutes, at least about 30 minutes, at least about one hour, at least about two hours, at least about three hours, at least about four hours, or at least about five hours. For example, the embodiments described herein include a pH dependent shell composition that preferentially dissolves in biological, artificial or simulated intestinal fluid as compared to biological, artificial or simulated gastric fluid.

As used herein, "pharmaceutically active ingredient," "active agent," "active ingredient," or "pharmaceutically active agent," refer to a drug or compound that may be used in the diagnosis, cure, mitigation, treatment, or prevention of a condition, and/or to a material that is intended to produce a therapeutic, prophylactic, or other intended effect, whether or not approved by a government agency for that purpose. These terms with respect to a specific agent include the pharmaceutically active agent, and all pharmaceutically acceptable salts, solvates and crystalline forms thereof, where the salts, solvates and crystalline forms are pharmaceutically active. In certain embodiments, suitable "active agents" include nutraceuticals, such as, vitamins, minerals, and supplements (VMS). Exemplary delayed release softgel capsules may include, without limitations, capsules containing lactic acid bacteria, probiotics, fish oil capsules, valproic acid, garlic, peppermint oil, ibuprofen solution or suspension, proton pump inhibitors, aspirin and similar products.

The term "condition" or "conditions" refers to those medical conditions that can be treated or prevented by administration to a subject of an effective amount of an active agent. Exemplary non-limiting conditions that may benefit from delayed release softgel capsules may include those conditions that may be treated or prevented by administration of, without limitations, capsules containing mesalamine, lactic acid bacteria, fish oil, nutritional supplements, proton pump inhibitors, aspirin and similar products.

Any pharmaceutically active ingredient may be used for purposes of the present invention, including both those that are water-soluble and those that are poorly soluble in water. Suitable pharmaceutically active ingredients include, without limitation, analgesics and anti-inflammatory agents, antacids, anthelmintic, anti-arrhythmic agents, anti-bacterial agents, anti-coagulants, anti-depressants, antidiabetics, antidiarrheal, anti-epileptics, anti-fungal agents, anti-gout agents, anti-hypertensive agents, anti-malarial, anti-migraine agents, anti-muscarinic agents, anti-neoplastic agents and immunosuppressants, anti-protozoal agents, anti-rheumatics, anti-thyroid agents, antivirals, anxiolytics, sedatives, hypnotics and neuroleptics, beta-blockers, cardiac inotropic agents, corticosteroids, cough suppressants, cytotoxics, decongestants, diuretics, enzymes, anti-parkinsonian agents, gastro-intestinal agents, histamine receptor antagonists, lipid regulating agents, local anesthetics, neuromuscular agents, nitrates and anti-anginal agents, nutritional agents, opioid analgesics, oral vaccines, proteins, peptides and recombinant drugs, sex hormones and contraceptives, spermicides, stimulants, and combinations thereof.

In some embodiments, the active pharmaceutical ingredient may be selected, without limitations, from the group consisting of dabigatran, dronedarone, ticagrelor, iloperidone, ivacaftor, midostaurine, asimadoline, beclomethasone, apremilast, sapacitabine, linsitinib, abiraterone, vitamin D analogs (e.g., calcifediol, calcitriol, paricalcitol, doxercalciferol), COX-2 inhibitors (e.g., celecoxib, valdecoxib, rofecoxib), tacrolimus, testosterone, lubiprostone, pharmaceutically acceptable salts thereof, and combinations thereof.

In some embodiments, lipids in the dosage form may be selected, without limitations, from the group consisting of, almond oil, argan oil, avocado oil, borage seed oil, canola oil, cashew oil, castor oil, hydrogenated castor oil, cocoa butter, coconut oil, colza oil, corn oil, cottonseed oil, grape seed oil, hazelnut oil, hemp oil, hydroxylated lecithin, lecithin, linseed oil, macadamia oil, mango butter, manila oil, mongongo nut oil, olive oil, palm kernel oil, palm oil, peanut oil, pecan oil, perilla oil, pine nut oil, pistachio oil, poppy seed oil, pumpkin seed oil, rice bran oil, safflower oil, sesame oil, shea butter, soybean oil, sunflower oil, hydrogenated vegetable oil, walnut oil, and watermelon seed oil. Other oil and fats may include, but not be limited to, fish oil (omega-3), krill oil, animal or vegetable fats, e.g., in their hydrogenated form, free fatty acids and mono-, di-, and tri-glycerides with C8-, C10-, C12-, C14-, C16-, C18-, C20- and C22-fatty acids, and combinations thereof.

According to certain embodiments, active agents may include lipid-lowering agents including, but not limited to, statins (e.g., lovastatin, simvastatin, pravastatin, fluvastatin, atorvastatin, rosuvastatin, and pitavastatin), fibrates (e.g, clofibrate, ciprofibrate, bezafibrate, fenofibrate, and gemfibrozil), niacin, bile acid sequestrants, ezetimibe, lomitapide, phytosterols, and the pharmaceutically acceptable salts, hydrates, solvates and prodrugs thereof, mixtures of any of the foregoing, and the like.

Suitable nutraceutical active agents may include, but are not limited to, 5-hydroxytryptophan, acetyl L-carnitine, alpha lipoic acid, alpha-ketoglutarates, bee products, betaine hydrochloride, bovine cartilage, caffeine, cetyl myristoleate, charcoal, chitosan, choline, chondroitin sulfate, coenzyme Q10, collagen, colostrum, creatine, cyanocobalamin (Vitamin 812), dimethylaminoethanol, fumaric acid, germanium sequioxide, glandular products, glucosamine HCI, glucosamine sulfate, hydroxyl methyl butyrate, immunoglobulin, lactic acid, L-Carnitine, liver products, malic acid, maltose-anhydrous, mannose (d-mannose), methyl sulfonyl methane, phytosterols, picolinic acid, pyruvate, red yeast extract, S-adenosylmethionine, selenium yeast, shark cartilage, theobromine, vanadyl sulfate, and yeast.

Suitable nutritional supplement active agents may include vitamins, minerals, fiber, fatty acids, amino acids, herbal supplements or a combination thereof.

Suitable vitamin active agents may include, but are not limited to, the following: ascorbic acid (Vitamin C), B vitamins, biotin, fat soluble vitamins, folic acid, hydroxycitric acid, inositol, mineral ascorbates, mixed tocopherols, niacin (Vitamin B3), orotic acid, para-aminobenzoic acid, panthothenates, panthothenic acid (Vitamin B5), pyridoxine hydrochloride (Vitamin B6), riboflavin (Vitamin B2), synthetic vitamins, thiamine (Vitamin B1), tocotrienols, vitamin A, vitamin D, vitamin E, vitamin F, vitamin K, vitamin oils and oil soluble vitamins.

Suitable herbal supplement active agents may include, but are not limited to, the following: arnica, bilberry, black cohosh, cat's claw, chamomile, echinacea, evening primrose oil, fenugreek, flaxseed, feverfew, garlic, ginger root, ginko biloba, ginseng, goldenrod, hawthorn, kava-kava, licorice, milk thistle, psyllium, rauowolfia, senna, soybean, St. John's wort, saw palmetto, turmeric, valerian.

Suitable mineral active agents may include, but not be limited to, the following: boron, calcium, chelated minerals, chloride, chromium, coated minerals, cobalt, copper, dolomite, iodine, iron, magnesium, manganese, mineral premixes, mineral products, molybdenum, phosphorus, potassium, selenium, sodium, vanadium, malic acid, pyruvate, zinc and other minerals.

Examples of other possible active agents include, but are not limited to, antihistamines (e.g., ranitidine, dimenhydrinate, diphenhydramine, chlorpheniramine and dexchlorpheniramine maleate), non-steroidal anti-inflammatory agents (e.g., aspirin, celecoxib, Cox-2 inhibitors, diclofenac, benoxaprofen, flurbiprofen, fenoprofen, flubufen, indoprofen, piroprofen, carprofen, oxaprozin, pramoprofen, muroprofen, trioxaprofen, suprofen, aminoprofen, fluprofen, bucloxic acid, indomethacin, sulindac, zomepirac, tiopinac, zidometacin, acemetacin, fentiazac, clidanac, oxpinac, meclofenamic acid, flufenamic acid, niflumic acid, tolfenamic acid, diflurisal, flufenisal, piroxicam, sudoxicam, isoxicam, aceclofenac, aloxiprin, azapropazone, benorilate, bromfenac, carprofen, choline magnesium salicylate, diflunisal, etodolac, etoricoxib, faislamine, fenbufen, fenoprofen, flurbiprofen, ibuprofen, indometacin, ketoprofen, ketorolac, lornoxicam, loxoprofen, meloxicam, mefenamic acid, metamizole, methyl salicylate, magnesium salicylate, nabumetone, naproxen, nimesulide, oxyphenbutazone, parecoxib, phenylbutazone, salicyl salicylate, sulindac, sulfinpyrazone, tenoxicam, tiaprofenic acid, tolmetin. pharmaceutically acceptable salts thereof and mixtures thereof) and acetaminophen, anti-emetics (e.g., metoclopramide, methylnaltrexone), anti-epileptics (e.g., phenyloin, meprobmate and nitrazepam), vasodilators (e.g., nifedipine, papaverine, diltiazem and nicardipine), anti-tussive agents and expectorants (e.g. codeine phosphate), anti-asthmatics (e.g. theophylline), antacids, anti-spasmodics (e.g. atropine, scopolamine), antidiabetics (e.g., insulin), diuretics (e.g., ethacrynic acid, bendrofluthiazide), anti-hypotensives (e.g., propranolol, clonidine), antihypertensives (e.g., clonidine, methyldopa), bronchodilatiors (e.g., albuterol), steroids (e.g., hydrocortisone, triamcinolone, prednisone), antibiotics (e.g., tetracycline), antihemorrhoidals, hypnotics, psychotropics, antidiarrheals, mucolytics, sedatives, decongestants (e.g. pseudoephedrine), laxatives, vitamins, stimulants (including appetite suppressants such as phenylpropanolamine) and cannabinoids, as well as pharmaceutically acceptable salts, hydrates, solvates, and prodrugs thereof.

The active agent that may also be a benzodiazepine, barbiturate, stimulants, or mixtures thereof. The term "benzodiazepines" refers to a benzodiazepine and drugs that are derivatives of a benzodiazepine that are able to depress the central nervous system. Benzodiazepines include, but are not limited to, alprazolam, bromazepam, chlordiazepoxide, clorazepate, diazepam, estazolam, flurazepam, halazepam, ketazolam, lorazepam, nitrazepam, oxazepam, prazepam, quazepam, temazepam, triazolam, as well as pharmaceutically acceptable salts, hydrates, solvates, prodrugs and mixtures thereof. Benzodiazepine antagonists that can be used as active agent include, but are not limited to, flumazenil as well as pharmaceutically acceptable salts, hydrates, solvates and mixtures thereof.

The term "barbiturates" refers to sedative-hypnotic drugs derived from barbituric acid (2,4,6,-trioxohexahydropyrimidine). Barbiturates include, but are not limited to, amobarbital, aprobarbotal, butabarbital, butalbital, methohexital, mephobarbital, metharbital, pentobarbital, phenobarbital, secobarbital as well as pharmaceutically acceptable salts, hydrates, solvates, prodrugs, and mixtures thereof. Barbiturate antagonists that can be used as active agent include, but are not limited to, amphetamines as well as pharmaceutically acceptable salts, hydrates, solvates and mixtures thereof.

The term "stimulants" includes, but is not limited to, amphetamines such as dextroamphetamine resin complex, dextroamphetamine, methamphetamine, methylphenidate, as well as pharmaceutically acceptable salts, hydrates, and solvates and mixtures thereof. Stimulant antagonists that can be used as active agent include, but are not limited to, benzodiazepines, as well as pharmaceutically acceptable salts, hydrates, solvates and mixtures thereof.

The dosage forms according to the disclosure include various active agents and their pharmaceutically acceptable salts thereof. Pharmaceutically acceptable salts include, but are not limited to, inorganic acid salts such as hydrochloride, hydrobromide, sulfate, phosphate and the like; organic acid salts such as formate, acetate, trifluoroacetate, maleate, tartrate and the like; sulfonates such as methanesulfonate, benzenesulfonate, p-toluenesulfonate, and the like; amino acid salts such as arginate, asparginate, glutamate and the like, and metal salts such as sodium salt, potassium salt, cesium salt and the like; alkaline earth metals such as calcium salt, magnesium salt and the like; organic amine salts such as triethylamine salt, pyridine salt, picoline salt, ethanolamine salt, triethanolamine salt, dicyclohexylamine salt, N,N'-dibenzylethylenediamine salt and the like.

As used herein, the terms "therapeutically effective" and an "effective amount" refer to the amount of active agent or the rate at which it is administered which is needed to produce a desired therapeutic result.

The terms "treatment of" and "treating" include the administration of an active agent with the intent to lessen the severity of a condition.

The terms "prevention of" and "preventing" include the avoidance of the onset of a condition by a prophylactic administration of the active agent.

The term "subject" refers to a human or animal who has demonstrated a manifestation (clinical or otherwise) of a condition suggesting the need for treatment with any of the active agents described herein.

As used herein, "shell" or "shell composition" refers to the shell of a softgel capsule which encapsulates a fill material. In certain embodiments, these terms are also interchangeable with the term "pH dependent shell composition."

As used herein, "conventional pH dependent polymers" refer to, but are not limited to, acrylic and methacrylic acid polymers, which may be available under the tradename EUDRAGIT® and other conventional acid insoluble polymers, e.g., methyl acrylate-methacrylic acid copolymers. Other conventional acid insoluble polymers include, without limitation, cellulose acetate succinate, cellulose acetate phthalate, cellulose acetate butyrate, hydroxypropyl methyl cellulose phthalate, hydroxy propyl methyl cellulose acetate succinate (hypermellose acetate succinate), polyvinyl acetate phthalate (PVAP), algenic acid salts such as sodium alginate and potassium alginate, stearic acid, and shellac. Pectin and pectin derivatives are not considered to be conventional pH dependent polymers. Gellan gum and gellan gum derivatives are not considered to be conventional pH dependent polymers. In some embodiments, the pH dependent shell composition of the present invention does not include an acid insoluble polymer. In other words, the pH dependent shell composition and the pH dependent softgel capsule are "free or substantially free of conventional pH dependent polymers."

As used herein, "free or substantially free," refers to a composition that comprises less than about 1 wt %, less than about 0.5 wt %, less than about 0.25 wt %, less than about 0.1 wt %, less than about 0.05 wt %, less than about 0.01 wt %, or 0 wt % of said component, based on total weight of the composition.

All references to wt % throughout the specifications and the claims refer to the weight of the component in reference to the weight of the entire composition and may also be designated as w/w.

As used herein, "fill material" or "fill" refers to the composition that is encapsulated by the pH dependent capsule shell and contains at least one active agent.

As used herein, "delayed release capsules" or "delayed release softgel capsules" or "pH dependent capsules" or "pH dependent softgel capsules" refer to capsules which have delayed or pH dependent properties once the fill material is encapsulated in the shell, and the capsules are dried. No further processing steps are required.

As used herein, "about" refers to any values that are within a variation of ±10%, such that "about 10" would include from 9 to 11. As used herein, "a," "an," or "the" refers to one or more, unless otherwise specified. Thus, for example, reference to "an excipient" includes a single excipient as well as a mixture of two or more different excipients, and the like.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of any and all examples, or exemplary language (e.g., "such as") provided herein, is intended merely to illuminate certain materials and methods and does not pose a limitation on scope. No language in the specification should be construed as indicating any non-claimed element as essential to the practice of the disclosed materials and methods.

According to a first embodiment, a pH dependent softgel capsule comprises (a) a fill material and (b) a pH dependent shell composition, wherein the fill material comprises at least one active agent, wherein the pH dependent shell composition comprises a gelatin, gellan gum, pectin, and optionally a plasticizer and/or dextrose. Preferably, the pH dependent shell composition is free or substantially free of additional pH dependent polymers (e.g., conventional pH dependent polymers).

Suitable fill materials comprise at least one active agent and can be made according to known methods. In addition to the at least one active agent, suitable fill materials may comprise additional fill components such as, at least one of flavoring agents, sweetening agents, coloring agents, fillers, other pharmaceutically acceptable excipients, or additives such as synthetic dyes and mineral oxides. Suitable amounts of active agent and pharmaceutically acceptable excipients can be readily determined by one of ordinary skill in the art.

In an embodiment, the gelatin in the pH dependent shell composition may include Type A gelatin, Type B gelatin, a hide or skin gelatin (e.g., calf skin, pig skin), and/or a bone gelatin (e.g., calf bone, pig bone), used alone or in combination. In one embodiment, the gelatin is a 250 Bloom gelatin. In another embodiment, there is only one type of gelatin. In yet another embodiment, the gelatin is a combination of at least two types of gelatins. In an embodiment, the amount of gelatin in the pH dependent shell composition is from about 30 wt % to about 85 wt %, from about 30 wt % to about 75 wt %, from about 30 wt % to about 65 wt %, from about 30 wt % to about 55 wt %, from about 30 wt % to about 40 wt %, from about 40 wt % to about 80 wt %, from about 45 wt % to about 75 wt %, or from about 50 wt % to about 70 wt %, or any single value or sub-range therein, based on total weight of the dry capsule shell composition.

In one embodiment, the pH dependent capsule shell composition comprises dextrose. In an embodiment, the amount of dextrose in the pH dependent capsule shell composition is from about 0.001 wt % to about 1.0 wt %, from about 0.002 wt % to about 0.008 wt %, from about 0.005 wt % or about 0.01 wt % to about 2 wt % or to about 4 wt %, from about 0.1 wt % or about 0.15 wt % to about 3 wt %, from about 0.1 wt % to about 1 wt %, from about 0.1 or about 0.15 wt % or about 0.2 wt % or about 0.25 wt % to about 2 wt %, from about 0.1 wt % to about 0.2 wt %, or from about 0.1 wt % to about 0.4 wt %, or any single value or sub-range therein, based on total weight of the dry capsule shell composition. The dextrose may be added to the delayed release capsule shell to mitigate potential reduction in gel strength of the shell composition. The concentration of dextrose in the pH dependent shell composition may be in an effective amount to improve the gel strength of the shell composition but not so high that it would interfere with the seal of the capsule, manufacturability of the capsule or shell composition, or the softgel's performance.

In some embodiments, the pH dependent shell composition may comprise pectin, e.g., a low methoxyl pectin. In an embodiment, the pectin is low methylester (LM) pectin with Degree of Esterification lower than 50. In some embodiments, the pectin is amidated pectin. In other embodiments, the low methoxyl (LM) pectin is non-amidated pectin. In certain embodiments, the pectin is a combination of amidated pectin and non-amidated pectin. The addition of pectin contributes to the pH dependent nature of the dosage form.

Too much pectin in the dosage form may reduce the gel strength of the softgel capsule which may in turn adversely affect the sealability of the softgel capsule. Too much pectin in the pH dependent shell composition may also increase the viscosity of the shell composition, making it challenging or impossible to process from a manufacturing standpoint.

Therefore, pectin may be added to the dosage form at a concentration that is sufficiently high to form a delayed release dosage form and at the same time is sufficiently low to mitigate the reduction in gel strength of the shell composition and to mitigate viscosity increase of the shell composition.

In an embodiment, an amount of pectin in the pH dependent shell composition is from about 2 wt % to about 20 wt %, from about 3 wt % to about 15 wt %, from about 3 wt % to about 5.5 wt %, from about 4 wt % to about 11 wt %, from about 7 wt % to about 12 wt %, from about 8 wt % to about 13 wt %, or from about 5 wt % to about 10 wt %, or any single value or sub-range therein, based on total weight of the dry capsule shell composition.

The degree of esterification of the pectin incorporated in the pH dependent shell composition may be lower than about 50%, or may range from about 10% to about 50%, from about 20% to about 40%, or from about 25% to about 35%. Also, the pectin may be amidated or non-amidated.

In certain embodiments, any of the pH dependent shell compositions described herein further comprise a gellan gum. In certain embodiments, the weight ratio of pectin to gellan gum is about 1:10 to about 50:1; about 1:5 to about 40:1; about 1:1 to about 25:1 or about 10:1 to about 24:1. In certain embodiments, the ratio of pectin to gellan gum may be tuned to attain a target pH dependent dissolution/disintegration profile for the shell composition.

In an embodiment, an amount of gellan gum in the pH dependent shell composition is from about 0.1 wt % to about 10 wt %, from about 0.2 wt % to about 8 wt %, from about 0.4 wt % to about 5 wt %, from about 0.05 wt % to about 5 wt %, from about 0.1 wt % to about 3 wt %, from about 0.2 wt % to about 2 wt %, from about 0.2 wt % to about 0.8 wt %, or from about 0.3 wt % to about 0.7 wt %, or any single value or sub-range therein, based on total weight of the dry capsule shell composition.

In an embodiment, the plasticizer in the pH dependent shell composition may include glycerol, sorbitol, and combinations thereof. Other suitable plasticizers may include, but not be limited to, sugar alcohol plasticizer such as isomalt, maltitol, xylitol, erythritol, adonitol, dulcitol, pentaerythritol, or mannitol; or polyol plasticizer such as diglycerin, ethylene glycol, diethylene glycol, triethyleneglycol, tetraethylene glycol, dipropylene glycol, a polyethylene glycol up to 10,000 MW, neopentyl glycol, propylene glycol, 1,3-propanediol, 2-methyl-1,3-propanediol, trimethylolpropane, a polyether polyol, ethanol amines; and mixtures thereof. Other exemplary plasticizers may also include, without limitations, low molecular weight polymers, oligomers, copolymers, oils, small organic molecules, low molecular weight polyols having aliphatic hydroxyls, ester-type plasticizers, glycol ethers, poly(propylene glycol), multi-block polymers, single block polymers, citrate ester-type plasticizers, and triacetin. Such plasticizers may include 1,2-butylene glycol, 2,3-butylene glycol, styrene glycol, monopropylene glycol monoisopropyl ether, propylene glycol monoethyl ether, ethylene glycol monoethyl ether, diethylene glycol monoethyl ether, sorbitol lactate, ethyl lactate, butyl lactate, ethyl glycolate, dibutyl sebacate, acetyltributylcitrate, triethyl citrate, glyceryl monostearate, polysorbate 80, acetyl triethyl citrate, tributyl citrate and allyl glycolate, and mixtures thereof.

In an embodiment, the amount of plasticizer in the pH dependent shell composition is from about 15 wt % to about 45 wt %, from about 15 wt % to about 40 wt %, from about 18 wt % to about 45 wt %, from about 18 wt % to about 42 wt %, from about 20 wt % to about 35 wt %, or from about 25 wt % to about 30 wt %, or any single value, or sub-range therein, based on total weight of the dry capsule shell composition.

In certain embodiments, the amount of the various components (e.g., pectin, dextrose, gelatin, gellan gum, plasticizer) and the ratio of the various components are tuned to control the dissolution and/or disintegration properties of the softgel capsule across various pH ranges.

For instance, the gelatin to pectin w:w ratio in the pH dependent shell composition may range from any of about 2:1, about 3:1, about 4:1, about 5:1, about 6:1, about 7:1, about 8:1, or about 9:1 to any of about 10:1, about 11:1, about 12:1, about 13:1, about 14:1, about 15:1, about 16:1, about 17:1, about 18:1, about 19:1, or about 20:1, or any sub-range or single value therein. In certain embodiments, lower gelatin to pectin w:w ratios provide for a pH dependent shell composition that is more stable (dissolves slower if at all) in acidic medium (e.g., 0.1N HCl optionally with Pepsin), while higher gelatin to pectin w:w ratios provide for a pH dependent shell composition that is less stable (dissolves faster) in acidic medium (e.g., 0.1N HCl optionally with Pepsin). The gelatin to pectin w:w ratio may be tuned to attain a particular dissolution time for softgel capsule at a particular pH as described herein.

The gelatin to plasticizer w:w ratio in the pH dependent shell composition may also be tuned to attain a particular capsule hardness level and may range from about 5:1 to about 1:5, from about 4:1 to about 1:4, from about 3:1 to about 1:3, from about 2:1 to about 1:2, about 1:1, or any single ratio value or sub-range therein.

In certain embodiments, the pH dependent shell compositions described herein may have a hardness ranging from any of about 5 N, about 6 N, about 7 N, about 8 N, about 9 N, or about 10 N to any of about 11 N, about 12 N, about 13 N, about 14 N, or about 15 N. The capsule hardness is determined using a hardness tester. The force required to cause a 2.0 mm deformation of the capsule in Newton is defined as the capsule hardness.

In certain embodiments, the pH dependent shell composition may have a viscosity ranging from any of about 20,000 cPs, about 30,000 cPs, about 40,000 cPs, about 50,000 cPs, about 60,000 cPs, or about 70,000 cPs to any of about 80,000 cPs, about 90,000 cPs, about 100,000 cPs, about 110,000 cPs, about 120,000 cPs, about 130,000 cPs, about 140,000 cPs, or about 150,000 cPs, or any sub-range or single value therein. In one embodiment, the pH dependent shell composition has a viscosity ranging from about 100,000 cPs to about 130,000 cPs, or from about 110,000 cPs to about 125,000 cPs, or about 115,000 cPs, or about 120,000 cPs. The viscosity is measured using a rheometer at 60° C. A gel mass sample (e.g., of any of the pH dependent shell compositions described herein) is loaded onto the platform of the rheometer, maintained at 60° C. A disc rotates at a certain speed to provide a fixed shear rate. The viscosity is obtained by measuring the shear stress and shear rate.

In an embodiment, the pH dependent shell composition and the pH dependent softgel capsule may be free or substantially free of conventional pH dependent polymers and/or be free of a pH dependent overcoat over the softgel shell.

In an embodiment, the pH dependent shell composition and the pH dependent softgel capsule may include divalent cation salts, such as $Ca^{++}$ (e.g., $CaCl_2$) or $Mg^{++}$ (e.g., $MgCl_2$). In another embodiment, the pH dependent shell composition and the pH dependent softgel capsule may be free or substantially free of divalent cation salts, such as $Ca^{++}$ (e.g., $CaCl_2$) or $Mg^{++}$ (e.g., $MgCl_2$). In a further embodiment, the pH dependent shell composition may not include the step of the addition of divalent cation salts, such as $Ca^{++}$ (e.g., $CaCl_2$) or $Mg^{++}$ (e.g., $MgCl_2$) other than an amount of divalent cation salts that me be present in other components.

In an embodiment, the pH dependent shell composition may optionally comprise additional agents such as coloring agents, flavorings agents, sweetening agents, fillers, antioxidants, diluents, pH modifiers or other pharmaceutically acceptable excipients or additives such as synthetic dyes and mineral oxides.

Exemplary suitable coloring agents may include, but not be limited to, colors such as e.g., white, black, yellow, blue, green, pink, red, orange, violet, indigo, and brown. In specific embodiments, the color of the dosage form can indicate the contents (e.g., one or more active ingredients) contained therein.

Exemplary suitable flavoring agents may include, but not be limited to, "flavor extract" obtained by extracting a part of a raw material, e.g., animal or plant material, often by using a solvent such as ethanol or water; natural essences obtained by extracting essential oils from the blossoms, fruit, roots, etc., or from the whole plants.

Additional exemplary flavoring agents that may be in the dosage form may include, but not be limited to, breath freshening compounds like menthol, spearmint, and cinnamon, coffee beans, other flavors or fragrances such as fruit flavors (e.g., cherry, orange, grape, etc.), especially those used for oral hygiene, as well as actives used in dental and oral cleansing such as quaternary ammonium bases. The effect of flavors may be enhanced using flavor enhancers like tartaric acid, citric acid, vanillin, or the like.

Exemplary sweetening agents may include, but not be limited to, one or more artificial sweeteners, one or more natural sweeteners, or a combination thereof. Artificial sweeteners include, e.g., acesulfame and its various salts such as the potassium salt (available as Sunett®), alitame, aspartame (available as NutraSweet® and Equal®), salt of aspartame-acesulfame (available as Twinsweet®), neohesperidin dihydrochalcone, naringin dihydrochalcone, dihydrochalcone compounds, neotame, sodium cyclamate, saccharin and its various salts such as the sodium salt (available as Sweet'N Low®), stevia, chloro derivatives of sucrose such as sucralose (available as Kaltame® and Splenda®), and mogrosides. Natural sweeteners include, e.g., glucose, dextrose, invert sugar, fructose, sucrose, glycyrrhizin; monoammonium glycyrrhizinate (sold under the trade name MagnaSweet®); *Stevia rebaudiana* (Stevioside), natural intensive sweeteners, such as Lo Han Kuo, polyols such as sorbitol, mannitol, xylitol, erythritol, and the like.

In some embodiments, the pH dependent shell composition and/or the pH dependent softgel capsule may be tested in a disintegration test performed in a USP disintegration apparatus. The pH dependent softgel capsule according to this embodiment may remain intact for at least about 15 minutes, at least about 30 minutes, at least about one hour, at least about two hours, at least about three hours, at least about four hours, or at least about five hours, in acidic medium (e.g., biological, artificial or simulated gastric fluid, such as pH 1.2 (0.1N HCl) optionally with Pepsin, or pH 2.0, or pH 3.0, or pH 4.0, or pH 5.0, or any sub-range or single pH value therein) and may disintegrate in biological, artificial or simulated intestinal fluid (e.g., pH 6.8 phosphate buffer optionally with Pancreatin, or at higher pH such as pH 7, pH 8, or pH 8.4) in about 120 minutes or less, about 60 minutes or less, about 30 minutes or less, in about 20 minutes or less, in about 10 minutes or less, or in about 5 minutes or less.

In some embodiments, the disintegration test (in acid stage and buffer stage cumulatively) may be performed for about 420 minutes, about 360 minutes, about 300 minutes, about 240 minutes, about 180 minutes, about 150 minutes, about 120 minutes, about 105 minutes, about 90 minutes, about 75 minutes, about 60 minutes, about 45 minutes, about 30 minutes, about 15 minutes, about 10 minutes, or about 5 minutes.

Encapsulation of the fill material can be accomplished in any conventional manner. As an example, a rotary die encapsulation may be used.

According to an embodiment, a pH dependent softgel capsule is prepared by the process comprising the steps of:

(a) preparing the fill material, said fill material comprising at least one active agent; and (b) encapsulating the fill material of step (a) in a pH dependent shell composition. The shell composition encapsulating the fill material in this process may have any of the compositions and/or any of the dissolution profiles described hereinbefore.

The encapsulation process according to step (b) may further comprise a sub-step of preparing the pH dependent shell composition by, for example, admixing a gelatin, gellan gum, a pectin and optionally a plasticizer and/or dextrose to form a wet gel mass. Preferably, wherein the pH dependent shell composition is free or substantially free of additional pH dependent polymers (such as conventional pH dependent polymers).

In some embodiments, the concentrations of the various components in the wet gel mass may be: (a) about 20 wt % to about 60 wt %, about 25 wt % to about 55 wt %, or about 27 wt % to about 45 wt % gelatin, (b) about 0.01 wt % to about 5 wt %, about 0.1 wt % to about 5 wt %, or about 0.1 wt % to about 0.5 wt % gellan gum, (c) about 1 wt % to about 10 wt %, about 2 wt % to about 10 wt %, or about 3 wt % to about 8 wt % of a pectin such as a low methoxyl pectin, (d) about 5 wt % to about 40 wt %, about 8 wt % to about 35 wt %, or about 10 wt % to about 32 wt % of a plasticizer, and optionally (e) about 0.01 wt % to about 4 wt %, about 0.01 wt % to about 3 wt %, or about 0.01 wt % to about 2.5 wt % dextrose, all wt % being based on the total weight of the wet gel mass with water being the remainder to reach 100 wt. %.

In certain embodiments, the process may further include forming a shell composition ribbon from the wet gel mass. The ribbon thickness of the pH dependent shell composition (as used for example during rotary die encapsulation) may also be tuned to control the pH dependent dissolution profile of the final delayed release softgel capsule. The ribbon thickness of the pH dependent shell composition may range, without limitations, from any of about 0.02 inches, about 0.022 inches, about 0.024 inches, about 0.026 inches, about 0.028 inches, or about 0.030 inches to any of about 0.032 inches, about 0.034 inches, about 0.036 inches, about 0.038 inches, about 0.04 inches, about 0.042 inches, about 0.044 inches, or about 0.050 inches or any sub-range or single value therein.

In certain embodiments, the pH dependent softgel capsule (e.g., after encapsulation) may be dried and optionally cured. Curing the softgel capsule may be performed at a temperature ranging from about 25° C. to about 75° C., about 25° C. to about 70° C., from about 30° C. to about 60° C., or from about 35° C. to 50° C. The curing temperature should be high enough to enhance the delayed release properties of the softgel capsules but not so high that it would melt the softgel capsule.

The duration of curing, if included in the process, may range from about 12 hours to about 168 hours, from about 18 hours to about 120 hours, from about 24 hours to about 72 hours, about 24 hours, about 48 hours, about 72 hours, or any sub-range or single values therein. In an embodiment, the curing of the softgel capsule may be performed at a temperature of about 40° C. for about 24 hours. In an embodiment, the curing of the softgel capsule may be performed at a temperature of about 40° C. for about 48 hours. In an embodiment, the curing of the softgel capsule may be performed at a temperature of about 40° C. for about 72 hours. In certain embodiments, the curing may occur in air (without any particular controls as to the content of nitrogen or oxygen or humidity). In certain embodiments, the curing may occur under inert conditions (e.g., in nitrogen).

In an embodiment, the process for preparing a pH dependent softgel capsule comprises, consists essentially of, or consists of a) preparing any of the fill materials described herein; b) encapsulating the fill material from step a) in any of the pH dependent shell compositions described herein (e.g., via rotary die encapsulation); c) drying the encapsulated pH dependent softgel capsules (e.g., by tumble drying or regular drying in a basket without tumbling); and optionally d) curing the pH dependent softgel capsule in accordance with any of the curing conditions described herein.

In certain embodiments, drying is performed at about 10° C. to about 50° C., about 15° C. to about 40° C., or about 20° C. to about 35° C. at a relative humidity of about 5% to about 40%, about 10% to about 30%, or about 15% to about 25%.

In certain embodiments, reference to drying and curing should be distinguished here. The purpose of drying the delayed release softgel capsules described herein is to remove excess water from the delayed release softgel capsule immediately after encapsulation. So, the capsules will be physically stable. The purpose of curing the delayed release softgel capsules described herein may be to enhance the delayed release property of the delayed release softgel capsule. Hence, the presence of a drying step is not the same as a curing step and similarly the presence of a curing step is not the same as a drying step.

In certain embodiments, delayed release softgel capsules having the pH dependent shell compositions described herein are chemically and physically stable.

For instance, their stability may be evidenced by the similarity of the pH dependent dissolution/disintegration profile of the delayed release softgel capsules after storage (e.g., for about 1 month, about 2 months, about 3 months, about 4 months, about 5 months, about 6 month, about 7 months, about 8 months, about 9 months, about 10 months, about 11 months, about 12 months, about 13 months, about 14 months, about 15 months, about 16 months, about 17 months, or about 18 months at conditions varying from ambient temperature to 40° C. and 75% relative humidity) to the dissolution/disintegration profile of the delayed release softgel capsules before storage. In certain embodiments, the pH dependent dissolution/disintegration profile of the delayed release softgel capsule is substantially similar (or within specifications), after storage for up to 18 months, up to 12 months, up to 6 months, up to 3 months, or up to 1 months (at ambient conditions or at stressed conditions of 40° C. and 75% relative humidity for any of these durations) as compared to the pH dependent dissolution/disintegration profile of the delayed release softgel capsule before storage.

The term "substantially similar" may refer to a particular value being within about 30%, within about 25%, within about 20%, within about 15%, within about 10%, within about 5%, or within about 1% of a corresponding comparative value. The percentage being calculated based on the face value of the comparative value. For instance, a dissolution time range of 27 minutes to 33 minutes may be considered within 10% of comparative dissolution time of 30 minutes.

In an embodiment, the pH dependent shell composition of the finished dosage form comprises: (a) a gelatin, (b) gellan gum, (c) a pectin such as a low methoxyl pectin, (d) a plasticizer, and optionally (e) dextrose.

In an embodiment, the pH dependent shell composition of the finished dosage form consists essentially of: (a) a gelatin, (b) gellan gum, (c) a pectin such as a low methoxyl pectin, (d) a plasticizer, and optionally (e) dextrose.

In an embodiment, the pH dependent shell composition consists of: (a) a gelatin, (b) gellan gum, (c) a pectin such as a low methoxyl pectin, (d) a plasticizer, and optionally (e) dextrose.

In an embodiment, the pH dependent shell composition of the finished dosage form comprises: (a) about 30 wt % to about 85 wt %, about 30 wt % to about 75 wt %, about 30 wt % to about 65 wt %, about 30 wt % to about 55 wt %, about 30 wt % to about 40 wt %, about 40 wt % to about 80 wt %, about 45 wt % to about 65 wt %, about 45 wt % to about 75 wt %, or about 50 wt % to about 70 wt % gelatin, (b) about 0.01 wt % to about 5 wt %, about 0.01 wt % to about 2 wt % or to about 4 wt %, from about 0.1 wt % to about 3 wt %, about 0.2 wt % to about 2 wt %, about 0.01 wt % to about 0.1 wt %, about 0.05 wt % to about 0.5 wt %, about 0.1 wt % to about 0.2 wt % dextrose, (c) about 2 wt % to about 20 wt %, about 3 wt % to about 15 wt %, about 7 wt % to about 15 wt %, about 3 wt % to about 5.5 wt %, or about 7 wt % to about 12 wt % of a pectin such as a low methoxyl pectin, (d) about 0.1 wt % to about 10 wt %, about 0.2 wt % to about 8 wt %, about 0.4 wt % to about 5 wt %, about 0.05 wt % to about 5 wt %, about 0.1 wt % to about 3 wt %, or about 0.2 wt % to about 2 wt % of gellan gum and (e) about 15 wt % to about 45 wt %, about 15 wt % to about 40 wt %, about 20 wt % to about 35 wt %, or about 25 wt % to about 30 wt % of a plasticizer. All wt % being based on the total weight of the dry pH dependent shell composition.

In an embodiment, the pH dependent shell composition of the finished dosage form consists essentially of: (a) about 30 wt % to about 85 wt %, about 30 wt % to about 75 wt %, about 30 wt % to about 65 wt %, about 30 wt % to about 55 wt %, about 30 wt % to about 40 wt %, about 40 wt % to about 80 wt %, about 45 wt % to about 65 wt %, about 45 wt % to about 75 wt %, or about 50 wt % to about 70 wt % gelatin, (b) about 0.01 wt % to about 5 wt %, about 0.01 wt % to about 2 wt % or to about 4 wt %, from about 0.1 wt % to about 3 wt %, about 0.2 wt % to about 2 wt %, about 0.01 wt % to about 0.1 wt %, about 0.05 wt % to about 0.5 wt %, about 0.1 wt % to about 0.2 wt % dextrose, (c) about 2 wt % to about 20 wt %, about 3 wt % to about 15 wt %, about 7 wt % to about 15 wt %, about 3 wt % to about 5.5 wt %, or about 7 wt % to about 12 wt % of a pectin such as a low methoxyl pectin, (d) about 0.1 wt % to about 10 wt %, about 0.2 wt % to about 8 wt %, about 0.4 wt % to about 5 wt %, about 0.05 wt % to about 5 wt %, about 0.1 wt % to about 3 wt %, or about 0.2 wt % to about 2 wt % of gellan gum and (e) about 15 wt % to about 45 wt %, about 15 wt % to about 40 wt %, about 20 wt % to about 35 wt %, or about 25 wt % to about 30 wt % of a plasticizer. All wt % being based on the total weight of the dry pH dependent shell composition.

In an embodiment, the pH dependent shell composition of the finished dosage form consists of: (a) about 30 wt % to about 85 wt %, about 30 wt % to about 75 wt %, about 30 wt % to about 65 wt %, about 30 wt % to about 55 wt %, about 30 wt % to about 40 wt %, about 40 wt % to about 80 wt %, about 45 wt % to about 65 wt %, about 45 wt % to about 75 wt %, or about 50 wt % to about 70 wt % gelatin, (b) about 0.01 wt % to about 5 wt %, about 0.01 wt % to about 2 wt % or to about 4 wt %, from about 0.1 wt % to about 3 wt %, about 0.2 wt % to about 2 wt %, about 0.01 wt % to about 0.1 wt %, about 0.05 wt % to about 0.5 wt %, about 0.1 wt % to about 0.2 wt % dextrose, (c) about 2 wt % to about 20 wt %, about 3 wt % to about 15 wt %, about 7 wt % to about 15 wt %, about 3 wt % to about 5.5 wt %, or about 7 wt % to about 12 wt % of a pectin such as a low methoxyl pectin, (d) about 0.1 wt % to about 10 wt %, about 0.2 wt % to about 8 wt %, about 0.4 wt % to about 5 wt %, about 0.05 wt % to about 5 wt %, about 0.1 wt % to about 3 wt %, or about 0.2 wt % to about 2 wt % of gellan gum and (e) about 15 wt % to about 45 wt %, about 15 wt % to about 40 wt %, about 20 wt % to about 35 wt %, or about 25 wt % to about 30 wt % of a plasticizer. All wt % being based on the total weight of the dry pH dependent shell composition.

In certain embodiments, the instant disclosure is directed to a method for tuning the pH dependent dissolution profile of any of the delayed release softgel capsules described herein by adjusting the amount of at least one of gelatin, pectin, and gellan gum (and optionally dextrose and/or plasticizer if present) in the shell composition to attain a target pH dependent dissolution profile in pH ranging from about 1.2 to about 8.4 (e.g., at one or more of pH 1.2, pH 2.0, pH 3.0, pH 4.0, pH 5.0, pH 6.0, pH 6.8, pH 7.0, pH 8.0, pH 8.4, or any sub-range or single pH value therein).

In certain embodiments, the instant disclosure is directed to a method of treating, preventing, or ameliorating a condition by administering to a subject in need thereof any of the delayed release softgel capsules described herein (which contains an active agent which may treat, prevent, or ameliorate said condition).

In certain embodiments, the instant disclosure is directed to a method of delivering an active agent to a target location within the gastrointestinal tract (e.g., to the colon, to the duodenum, to the small and large intestine, or to the jejunum) by administering to a subject any of the delayed release softgel capsules described herein, wherein the shell composition of the delayed release softgel capsule dissolves/disintegrates in a pH of the target location in up to about 120 minutes, in up to about 90 minutes, in up to about 60 minutes, in up to about 30 minutes, or in up to about 15 minutes, and wherein the shell composition of the delayed release softgel capsule does not dissolve/disintegrate or does not substantially dissolve/disintegrate in a pH that is lower than the pH of the target location in up to about 120 minutes, in up to about 90 minutes, in up to about 60 minutes, in up to about 30 minutes, or in up to about 15 minutes.

EXAMPLES

Specific embodiments of the invention will now be demonstrated by reference to the following examples. It should be understood that these examples are disclosed solely by way of illustrating the invention and should not be taken in any way to limit the scope of the present invention.

Summary of Dissolution Studies of Delayed Release Softgel Capsules at Various pH Conditions Pectin based delayed release softgel capsules manufactured with pectin alone plus gelatin could only stay intact in pH 2.0 or lower for extended period of time (120 minutes) which is a standard in-vitro enteric test. When subjected to pH 3.0 or above medium, the pectin based softgel capsules ruptured in 5-7 minutes and completely dissolved and became immediate release capsules (Table 1A). This may result in premature ruptures of softgel capsules in the upper gastro-intestinal tract in humans due to the pH variations caused by human diet. The premature rupture of softgel capsules may lead to undesirable side effects in patients and reduce the bioavailability of certain drug products. The tests were performed with a USP Apparatus II with paddles at 50 RPM, 750-900 ml 0.1N HCL acidic media adjusted to pH 1.2, 2.0, 3.0, 4.0 and 5.0 with phosphate buffer. After two hours, 250 ml phosphate buffer solution is added to adjust the pH to 6.8.

TABLE 1A

| Dissolution Results of Delayed Release Softgel Capsules Containing Pectin Alone | | | | | | | | |
|---|---|---|---|---|---|---|---|---|
| | | | | | Different pH Value (0.1N HCl + 0.2M Sodium Phosphate) | | | |
| Lot No. | Pectin | Dextrose | Gellan gum | Disso Condition | pH = 2 | pH = 3 | pH = 4 | pH = 5 |
| 19MC-03 | Yes | Yes | None | Acidic medium | No rupture | 7 min | 6 min | — |
| | | | | Buffer pH 6.8 | 4 min | N/A | N/A | — |

The shell composition of Lot No. 19MC-03 is summarized in Table 1B.

TABLE 1B

| Shell Composition for Lot No. 19MC-03 | | |
|---|---|---|
| No | Ingredient | Composition Wt. % |
| 1 | Pectin (amidated) | 4.0-12.0 |
| 2 | Gelatin | 40.0-65.0 |
| 3 | Plasticizers | 10.0-40.0 |
| 4 | Water | 6.0-15.0 |
| 5 | Dextrose | 0.01-5.0 |
| 6 | Total | 100.00 |

By virtue of the present invention, when gellan gum is added to the pectin gel masses (Table 2A wet mass; Table 2B dry capsule shell composition), the resulting delayed release softgel capsules stayed intact for 120 minutes in media up to pH 3.0, and stayed intact for 60 minutes in media with pH between 3 and 5 (Table 3). This wider range of pH tolerability for the delayed release softgel capsules allows the softgel capsules to pass the stomach intact and release the drugs in the intestine to achieve the intended therapeutic benefits in the target location, prevent or minimize the side effects associated with premature release of the drug, and protect the active agent from low pH that might occur in the upper gastro-intestinal tract due to, e.g., variations in a patient's diet. The pectin to gellan gum weight ratio in the dry shell composition ranged from 10:1 to 24:1.

TABLE 2A

| Wet Gel Mass Composition of Lot No. 19MC-19 | |
|---|---|
| Ingredient | Percentage Wt. % |
| Pectin (non-amidated and amidated pectin) | 3.0-8.0 |
| Gellan Gum | 0.1-5.0 |
| Gelatin | 27.0-45.0 |
| Plasticizers | 10.0-32.0 |
| Water | 20.0-48.0 |
| Dextrose | 0.01-2.5 |
| Total | 100.00 |

TABLE 2B

| Dry Capsule Shell Composition of Lot No. 19MC-19 | |
|---|---|
| Ingredient | Percentage Wt. % |
| Pectin (non-amidated and amidated pectin) | 5.2-15.5 |
| Gellan Gum | 0.4-5.0 |
| Gelatin | 48.0-65.0 |
| Plasticizers | 21.0-46.0 |
| Water | 6.0-15.0 |
| Dextrose | 0.05-4.7 |
| Total | 100.00 |

TABLE 3

| Dissolution Results of Delayed Release Softgel Capsules Containing Pectin and Gellan Gum as per Tables 2 A and 2 B | | | | | | | | |
|---|---|---|---|---|---|---|---|---|
| | | | | | Different pH Value (0.1N HCl + 0.2M Sodium Phosphate) | | | |
| Lot No. | Pectin | Dextrose | Gellan gum | Dissolution Condition | pH = 2 | pH = 3 | pH = 4 | pH = 5 |
| 19MC-19 | Yes | Yes | Yes | Acidic medium | No rupture | No rupture | 60 min | 60 min |
| | | | | Buffer pH 6.8 | 8 min | 19 min | N/A | N/A |

Inventive stability samples having the shell composition of Table 2B were stored at 6 months at 40° C. and 75% relative humidity. Comparative stability samples having the shell composition of Table 4 were also stored at 6 months at 40° C. and 75% relative humidity. The comparative and inventive stability samples were subjected to dissolution tests at pH 5 without addition of Pepsin and with addition of Pepsin. The results of the dissolution tests are summarized in Table 5 below. The tests were performed with a USP Apparatus II with paddles at 100 RPM, 750-900 ml 0.1N HCL acidic media, with pepsin (if indicated so), adjusted to pH 5.0 with phosphate buffer (also referred to as "Acid Stage"). After two hours, 250 ml phosphate buffer solution is added to adjust the pH to 6.8, with pancreatin (if indicated so) (also referred to as "pH 6.8 Buffer" or as "Buffer"). Capsules that ruptured in up to two hours in the Acid Stage were not subjected to pH 6.8 buffer testing.

TABLE 4

Dry Capsule Shell Composition of Lot No. 20MC-32

| Ingredient | Percentage Wt. % |
|---|---|
| Pectin (non-amidated and amidated pectin) | 8.0-12.0 |
| Gell an Gum | 0 |
| Gelatin | 30.0-55.0 |
| Plasticizers | 15.0-40.0 |
| Water | 6.0-15.0 |
| Dextrose | 0.01-5.0 |
| Total | 100.00 |

TABLE 5

Dissolution Test Results of Stability Samples

| Lot No. | | | Gellangum | Different pH Value (0.1N HCl for 120 mins + 0.2M Sodium Phosphate) USP APP II, 100 rpm | |
|---|---|---|---|---|---|
| (Stability Conditions) | Dissolution Stage | RPM | (wt % dry shell) | pH = 5 | pH = 5 With Pepsin |
| 19MC-19 (6M 40° C./75% RH) | Acidic | 100 | 0.5 | NO rupture in 120 mins | NO rupture in 120 mins |
| | Buffer | 100 | | NO rupture in 60 mins | Ruptured @ 23 min with pancreatin |
| 20MC-32 (6M 40° C./75% RH) | Acidic | 100 | 0 | Ruptured @ 76 mins | N/A |

According to Table 5, addition of gellan gum delays the dissolution of the shell composition/softgel capsules (or contributed to the shell compositions/softgel capsules to survive longer) at higher pH environments as compared to shell compositions/softgel capsules without gellan gum. This is true even when the acid stage includes pepsin, which is presumed to be a more aggressive environment than 0.1N HCl without Pepsin.

The effect of the concentration of gellan gum on the dissolution of the shell composition was further evaluated by comparing the dissolution of inventive stability samples having 0.5 wt. % gellan gum (based on the total weight of the dry shell composition) and 0.3 wt. % gellan gum (based on the total weight of the dry shell composition). The stability samples were stored for 6 months at 40° C. and 75% relative humidity. The results of the dissolution tests are summarized in Table 6 below. The tests were performed with a USP Apparatus II with paddles at 100 RPM, 750-900 ml 0.1N HCL acidic media, adjusted to pH 5.0 with phosphate buffer (also referred to as "Acid Stage"). After two hours, 250 ml phosphate buffer solution is added to adjust the pH to 6.8, with pancreatin (if indicated so) (also referred to as "pH 6.8 Buffer" or as "Buffer"). Capsules that ruptured in up to two hours in the Acid Stage were not subjected to pH 6.8 buffer testing.

TABLE 6

| Lot No. (Stability Storage Conditions) | Dissolution Stage | RPM | Pectin Type | Gellangum % dry shell | Different pH Value (0.1N HCl for 120 mins + 0.2M Sodium Phosphate) USP APP II, 100 rpm pH = 5 |
|---|---|---|---|---|---|
| | | | | Effect of Gellan Gum Concentration on Dissolution | |
| 19MC-19 (6M 40° C/75% RH) | Acidic | 100 | Non-amidated | 0.5 | NO rupture in 2 hours |
| | Buffer | 100 | | | Ruptured @ 23 mins with pancreatin |
| 3980800A (6M 40° C/75% RH) | Acidic | 100 | Non-amidated | 0.3 | Ruptured @ 68 mins |

According to Table 6, higher gellan gum concentration results in more robust capsules compared to capsules containing less gellan gum.

TABLE 7

Dry Capsule Shell Composition of Lot No. 3980800A

| Ingredient | Percentage Wt. % |
|---|---|
| Pectin (non-amidated and amidated pectin) | 4.0-12.0 |
| Gellan Gum | 0.3-4.0 |
| Gelatin | 30.0-65.0 |
| Plasticizers | 15.0-40.0 |
| Water | 6.0-15.0 |
| Dextrose | 0.01-5.0 |
| Total | 100.00 |

The effect of the gellan gum on the dissolution of softgel capsules, that had not been cured and were stored for 18 months under ambient conditions (i.e., room temperature and no humidity control) was assessed. The results of the dissolution tests are summarized in Table 8 below. The tests were performed with a USP Apparatus II with paddles at 100 RPM followed by 50 RPM, 750-900 ml 0.1N HCL acidic media, adjusted to pH 3.0, 4.0, and 5.0 with phosphate buffer, 0.2M sodium phosphate (also referred to as "Acid Stage"). After two hours, 250 ml phosphate buffer solution is added to adjust the pH to 6.8 (also referred to as "pH 6.8 Buffer" or as "Buffer"). Capsules that ruptured in up to two hours in the Acid Stage were not subjected to pH 6.8 buffer testing.

TABLE 8

| Lot No. (Stability Storage Conditions) | Dissolution Stage | RPM | Gellan-gum wt % dry shell | Different pH Value (0.1N HCl for 120 mins + 0.2M Sodium Phosphate) USP APP II, 100 rpm first and then 50 RPM | | |
|---|---|---|---|---|---|---|
| | | | | pH = 3 | pH = 4 | pH = 5 |
| | | | Gellan Gum Increased Survival Time for Capsules That Were Not Cured | | | |
| 19MC-19 (18 months Ambient) NOT Cured | Acidic | 50 RPM | 0.5 | 1 capsule ruptured @ 84 mins; 2 capsules did not rupture for 120 mins | Ruptured @ 53 mins | Ruptured @ 47 mins |
| 19MC-03 (18 months Ambient) NOT Cured | Acidic | 50 RPM | 0 | Ruptured @ 42 mins | Ruptured @ 39 mins | Ruptured @ 46 mins |

Not cured capsules containing gellan gum consistently stayed intact longer in acidic medium compared to capsules without gellan gum.

The effect of the gellan gum on the dissolution of softgel capsules, that were cured at 40° C. for 96 hours, was assessed. The results of the dissolution tests are summarized in Table 9 below. The tests were performed with a USP Apparatus II with paddles at 100 RPM followed by 50 RPM, 750-900 ml 0.1N HCL acidic media, adjusted to pH 4.0 and 5.0 with phosphate buffer, 0.2M sodium phosphate (also referred to as "Acid Stage"). After two hours, 250 ml phosphate buffer solution is added to adjust the pH to 6.8 (also referred to as "pH 6.8 Buffer" or as "Buffer"). Capsules that ruptured in up to two hours in the Acid Stage were not subjected to pH 6.8 buffer testing.

TABLE 9

| Gellan Gum Increased Survival Time for Cured Capsules | | | | | | |
|---|---|---|---|---|---|---|
| | | | | | Different pH Value (0.1N HCl for 120 mins + 0.2M Sodium Phosphate) USP APP II, 100 rpm first and then 50 RPM | |
| Lot No. (Stability Storage Conditions) | Dissolution Stage | RPM | Pectin Type | Gellan-gum % dry shell | pH = 4 | pH = 5 |
| 4184903 A1 Cured | Acidic | 50 RPM | Non-amidated | 0 | All Ruptured @ 48 mins | All Ruptured @ 45 mins |
| 19MC-19 (18 months Ambient) Cured | Acidic | 50 RPM | Non-amidated | 0.5 | 2 Capsules Ruptured @ 50 mins; 1 Capsule did not rupture | 1 Capsule Ruptured @ 68 mins; 2 Capsules did Not Rupture |

TABLE 10

| Dry Capsule Shell Composition of Lot No. 4184903 A1 | |
|---|---|
| Ingredient | Percentage Wt. % |
| Pectin (non-amidated and amidated pectin) | 8.0-13.0 |
| Gell an Gum | 0 |
| Gelatin | 42.0-65.0 |
| Plasticizers | 25.0-40.0 |
| Water | 6.0-15.0 |
| Dextrose | 0.01-5.0 |
| Total | 100.00 |

Cured capsules containing gellan gum had longer survival time than capsules without gellan gum.

Inventive stability samples, having the shell composition of Table 2B, that were stored for 6 months at 40° C. and 75% relative humidity were subjected to disintegration tests at various pH values. The results of the disintegration tests are summarized in Table 11 below. The disintegration tests were performed with a USP disintegration apparatus in 750-900 ml 0.1N HCL acidic media adjusted to pH 4.0 and 5.0 with phosphate buffer (also referred to as "Acid Stage"). After two hours, 250 ml phosphate buffer solution is added to adjust the pH to 6.8 (also referred to as "pH 6.8 Buffer").

TABLE 11

| Disintegration Results of Stability Samples, With and Without Gellan Gum, Stored for 6 Months at 40° C./75% RH | | | | | |
|---|---|---|---|---|---|
| | | Disintegration at Higher pH Values (0.1N HCl + 0.2M Sodium Phosphate) | | | |
| | | No Disc with SS Cover | | No Disc with SS Cover | |
| Lot(Storage Conditions) | Gellan Gum (Dry Shell wt %) | Acid Stage pH = 4 (2 hrs) | pH = 6.8 Buffer | Acid Stage pH = 5 (2 hours) | pH = 6.8 Buffer |
| Lot 19MC-19 (40 C/75% RH T = 6M) | 0.5 | No Rupture | 20 minutes | No Rupture | 6 minutes |
| Lot 20MC-32 (40 C/75% RH T = 6M) | 0 | Ruptured @ 72 mins | N/A | Ruptured @ 58 mins | N/A |

Capsules containing gellan gum survived 120 minutes of disintegration tests in pH 4 and pH 5; capsules without gellan gum didn't survive the full length of the Acid Stage portion of the test.

For simplicity of explanation, the embodiments of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

In the foregoing description, numerous specific details are set forth, such as specific materials, dimensions, processes parameters, etc., to provide a thorough understanding of the present disclosure. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment.

The present disclosure has been described with reference to specific exemplary embodiments thereof. The specification and drawings are, accordingly, to be regarded in an illustrative rather than a restrictive sense. Various modifications of the disclosure in addition to those shown and described herein will become apparent to those skilled in the art and are intended to fall within the scope of the appended claims.

What is claimed is:

1. A delayed release softgel capsule comprising:
(a) a fill material; and
(b) a shell composition,
wherein the fill material comprises at least one active agent, and
wherein the shell composition comprises gelatin and a pH dependent polymer comprising pectin and gellan gum, wherein a ratio of the pectin to gellan gum is from about 10:1 to about 24:1, and about 0.01 wt % to about 2 wt % of dextrose, wherein the shell composition does not rupture at a pH of 4 at 15 minutes, 30 minutes, 45 minutes or 60 minutes when measured with a USP Apparatus II with paddles at 50 RPM, 900 ml 0.1N HCL acidic media adjusted to pH with phosphate buffer.

2. The delayed release softgel capsule of claim 1, wherein the shell composition does not rupture at a pH of 5 at 15 minutes, 30 minutes, 45 minutes or 60 minutes when measured with a USP Apparatus II with paddles at 50 RPM, 900 ml 0.1N HCL acidic media adjusted to pH with phosphate buffer.

3. The delayed release softgel capsule of claim 1, wherein the shell composition does not rupture at a pH of between 5 and 6 at 15 minutes, 30 minutes, 45 minutes or 60 minutes when measured with a USP Apparatus II with paddles at 50 RPM, 900 ml 0.1N HCL acidic media adjusted to pH with phosphate buffer.

4. The delayed release softgel capsule of claim 1, wherein the shell composition does not rupture at a pH of between 6 and 7 at 15 minutes, 30 minutes, 45 minutes, or 60 minutes, when measured with a USP Apparatus II with paddles at 50 RPM, 900 ml 0.1N HCL acidic media adjusted to pH with phosphate buffer.

5. The delayed release softgel capsule of claim 1, wherein the shell composition does not rupture at a pH of between 7 and 8 at 15 minutes, 30 minutes, 45 minutes, or 60 minutes when measured with a USP Apparatus II with paddles at 50 RPM, 900 ml 0.1N HCL acidic media adjusted to pH with phosphate buffer.

6. The delayed release softgel capsule of claim 1, wherein the shell composition does not rupture at a pH of between 8 and 8.4 at 15 minutes, 30 minutes, 45 minutes, or 60 minutes when measured with a USP Apparatus II with paddles at 50 RPM, 900 ml 0.1N HCL acidic media adjusted to pH with phosphate buffer.

7. The delayed release softgel capsule of claim 1, wherein the shell composition is derived from a wet mass comprising 0.1 to 5% gellan gum.

8. The delayed release softgel capsule of claim 7, wherein the wet mass further comprises from about 2% to about 10% pectin.

9. The delayed release softgel capsule of claim 1, wherein the shell composition comprises about 40 wt % to about 80 wt % of a gelatin, based on total weight of the dry shell composition.

10. The delayed release softgel capsule of claim 1, wherein the shell composition comprises about 0.1 wt % to about 10 wt % or about 0.4 wt % to about 5 wt % of gellan gum, based on total weight of the dry shell composition.

11. The delayed release softgel capsule of claim 1, wherein the shell composition comprises about 0.1 wt % to about 10 wt % or about 2 wt % to about 20 wt % of pectin, based on total weight of the dry shell composition.

12. A process for preparing a delayed release softgel capsule according to claim 1 comprising the steps of:
preparing a fill material comprising an active agent; and
encapsulating the fill material with a shell composition, wherein the shell composition comprises gelatin and a pH dependent polymer comprising pectin and gellan gum, wherein the shell composition does not rupture at a pH of 4 at 15 minutes, 30 minutes, 45 minutes or 60 minutes when measured with a USP Apparatus II with paddles at 50 RPM, 900 ml 0.1N HCL acidic media adjusted to pH with phosphate buffer.

13. A method of delivering an active agent to a target location within the gastrointestinal tract, the method comprising administering to a subject the delayed release softgel capsule according to claim 1,
wherein the shell composition of the delayed release softgel capsule dissolves/disintegrates in a pH of the target location in up to about 120 minutes, in up to about 90 minutes, in up to about 60 minutes, in up to about 30 minutes, or in up to about 15 minutes, and wherein the shell composition of the delayed release softgel capsule does not dissolve/disintegrate or does not substantially dissolve/disintegrate in a pH that is lower than the pH of the target location in up to about 120 minutes, in up to about 90 minutes, in up to about 60 minutes, in up to about 30 minutes, or in up to about 15 minutes.

* * * * *